DEMODULATOR FOR FREQUENCY MODULATED SIGNAL

Filed Oct. 12, 1965 6 Sheets-Sheet 1

INVENTORS
KENNETH K. CLARKE
DONALD T. HESS
BY
James and Franklin
ATTORNEYS

DEMODULATOR FOR FREQUENCY MODULATED SIGNAL

Filed Oct. 12, 1965 6 Sheets-Sheet 2

INVENTORS
KENNETH K. CLARKE
DONALD T. HESS
BY James and Franklin
ATTORNEYS

Dec. 13, 1966 K. K. CLARKE ET AL 3,292,093

DEMODULATOR FOR FREQUENCY MODULATED SIGNAL

Filed Oct. 12, 1965 6 Sheets-Sheet 3

INVENTORS
KENNETH K. CLARKE
DONALD T. HESS
BY

ATTORNEYS

DEMODULATOR FOR FREQUENCY MODULATED SIGNAL

Filed Oct. 12, 1965 6 Sheets-Sheet 4

INVENTORS
KENNETH K. CLARKE
DONALD T. HESS
BY
James and Franklin
ATTORNEYS

DEMODULATOR FOR FREQUENCY MODULATED SIGNAL

Filed Oct. 12, 1965

INVENTOR
KENNETH K. CLARKE
DONALD T. HESS
BY James and Franklin
ATTORNEYS

DEMODULATOR FOR FREQUENCY MODULATED SIGNAL

Filed Oct. 12, 1965 6 Sheets-Sheet 6

INVENTORS
KENNETH K. CLARKE
DONALD T. HESS
BY
James and Franklin
ATTORNEYS 3,292,093

DEMODULATOR FOR FREQUENCY MODULATED SIGNAL

Kenneth K. Clarke, 300 Riverside Drive, New York, N.Y., and Donald T. Hess, 88–11 Union Turnpike, Glendale, N.Y.

Filed Oct. 12, 1965, Ser. No. 500,477
14 Claims. (Cl. 329—129)

This application is a continuation-in-part of our application Serial No. 332,436 filed December 23, 1963, now abandoned, under the same title. The invention relates to a demodulation or frequency discriminating circuit for demodulating frequency modulated signals.

Present methods of demodulating frequency modulated signals fall within two broad classes. The first of these is commonly called a pulse count system or a zero axis counting system. Such a circuit causes the incoming signal to be converted into a square wave and the square wave to be converted into a succession of exponentially decaying unidirectional trigger voltages. Then in some cases a low pass filter is employed to measure the average value of the voltage or current in these pulses directly. In other cases these trigger voltages are converted into another form, usually by employing a monostable multivibrator or by a further amplifying and clipping operation to produce a flat topped pulse, and these new pulses are applied to the low pass filter to produce an output that varies with frequency.

For slowly varying frequencies such a system allows a linear slope of output versus frequency up to an upper frequency limit that is set by the reciprocal of the time duration of the pulses plus any necessary recovery times. The system has the generally undesirable feature of presenting an output voltage or current which is always above zero. If an output signal is desired which has positive and negative excursions about zero as the instantaneous frequency makes excursions about a prescribed center frequency, some form of D.C. bucking current or voltage source must be added to the circuit. Such a system may be adjusted properly in a laboratory but is not desirable for commercial use because changes in either the D.C. bucking voltage or in the amplitudes or durations of the pulses being averaged lead to effective detuning of the circuit from its desired center frequency. Such undesired changes may occur because of the aging of components, the changing of the temperature of the circuitry, and for other reasons.

The second widely used frequency demodulating scheme is known generally as a phase discriminator circuit, and in one form is known as the Foster-Seely discriminator, and in another form is known as a ratio detector.

Frequency detectors of this type employ tuned, multiwinding transformers and balanced type peak detecting circuitry to produce an output voltage versus frequency characteristic that makes equal positive and negative excursions about zero voltage as the frequency makes equal excursions about a given center frequency. This requires multiwinding tuned transformers, and balanced circuitry. The tuned transformers seriously limit the bandwidth over which linear operation may be obtained. The bandwidth of linear operation is often considered to be limited to approximately one-tenth or less of the center frequency of operation. Because these circuits use tuned transformers they should receive sine wave inputs. Since they require transformers they are difficult to apply at low frequency where transformers become large and unwieldy, and the narrow bandwidth is a limitation. Also they are difficult to apply to integrated circuitry because in such circuitry transformers are difficult to manufacture and adjust.

The general object of our invention is to improve demodulators for FM signals.

A further object is to provide a circuit for the demodulation of frequency modulated signals that will overcome the above difficulties, and that will combine the wideband linear capabilities of the previously known pulse count discriminator, with the symmetrically positive and negative voltage or current vs. frequency characteristic of the balanced phase discriminator circuit.

Another object is to provide a circuit for the demodulation of frequency modulated signals that provides a symmetrical, wideband, voltage vs. frequency characteristic, without requiring external sources of D.C. bucking current or voltages.

Still another object of our invention is to provide a circuit for the demodulation of frequency modulated signals which requires neither balanced circuitry, nor multiwinding tuned transformers, nor in many of its embodiments any coils or inductances whatsoever.

A still further object is to provide a circuit for the linear, wideband, symmetrical demodulation of frequency modulated signals of a variety of input waveshapes. Certain embodiments of our invention will directly receive and demodulate frequency modulated waves in either square, rectangular, triangular, or sinusoidal form. In accordance with a further feature and object, the slope of the low frequency output versus high frequency characteristic is largely independent of the input waveshape.

Another object is to provide a circuit for the demodulation of frequency modulated signals in which the frequency value of the center frequency may be varied without affecting the slope of the output versus frequency curve. In some embodiments of our invention such a variation may be carried out by varying a single resistor, or a single reactor, and in other embodiments by tuning a single tuned circuit.

It is a further object of our invention to provide a circuit for the demodulation of frequency modulated signals in which the slope of the output versus frequency characteristic may be varied without affecting the center frequency of the circuit. In some embodiments this may be done by varying a reactor and a resistor, or a resistor alone, and again the variation may be carried out either manually or by some kind of sensor.

A further object is to provide circuitry using diodes, and other circuitry using transistors, the latter being preferred for better isolation as between the output circuit and the input circuit of the demodulator.

To accomplish the foregoing general objects, and other more specific objects which will hereinafter appear, our invention resides in the demodulator circuitry and the elements thereof and their relation one to another, as are hereinafter more particularly described in the following specification. The specification is accompanied by drawings in which.

Figure 20:
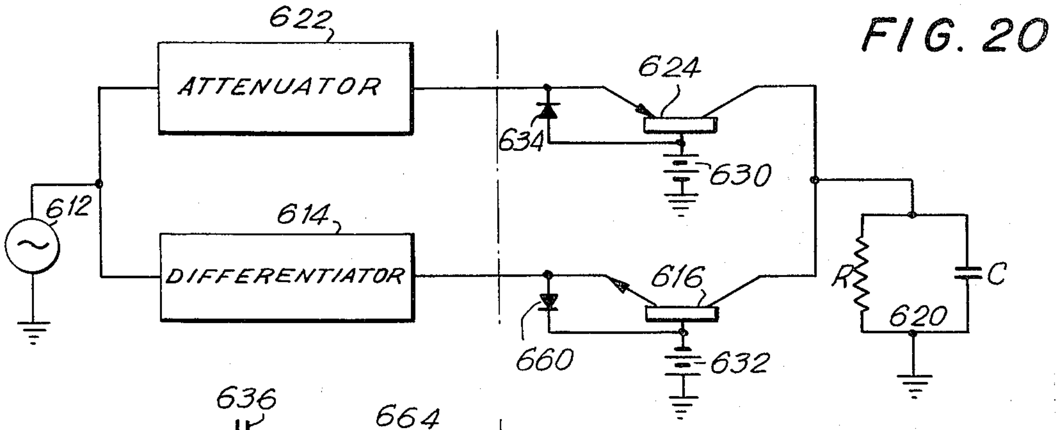
FIG. 20 is a circuit diagram showing the use of transistors as the switching means between the attenuator and the output circuit, and between the differentiator and the output circuit.

FIGS. 21 through 25 correspond to the left portion of FIG. 20 and show different kinds of circuit components used as the attenuator and as the differentiator; and FIGS. 26 through 30 are left portions which illustrate the use of composite differentiator circuits.

Figure 1:
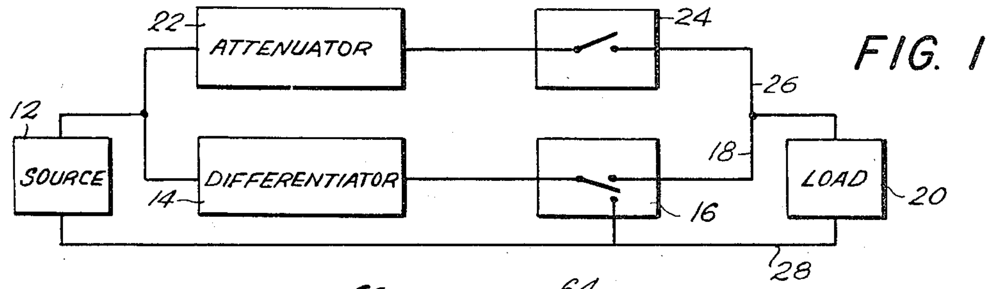
FIG. 1 is a block diagram explanatory of the invention.

Referring to the drawing, and more particularly to the block diagram of FIG. 1, the source 12 is considered to supply a frequency modulated voltage of known waveshape and constant amplitude. Although it is not necessary for the operation of our circuit it is convenient for purposes of explanation to assume that the positive and negative half cycles of each cycle have essentially the same shape.

The attenuator 22 reduces the amplitude of the wave without affecting its shape. The differentiator or quasi-differentiator 14 performs the operation of exact or approximate differentiation of the ipnut signal. For example, if the source 12 supplies a sinusoidal voltage E sinwt, the output of an ideal differentiator would be KEw coswt. The constant K is merely a multiplier introduced by the particular circuitry which is performing the differentiation. A quasi-differentiator is any device which performs the operation of differentiation over a band of frequencies in the frequency domain or approximates the operation of differentiation in the time domain. Any linear device which when driven by a sinusoidal voltage or current of constant amplitude produces a sinewave at the output whose amplitude varies in proportion to the frequency of the input sinusoid over a band of frequencies, is an approximate frequency domain differentiator over the corresponding band of frequencies.

An approximate derivative of a function, $f(t)$ in the time domain is given by $K[f(t)-f(t-t_0)]$ where K and $t_0$ are constants. The constant $t_0$ is chosen to be small compared with the reciprocal of the maximum frequency component of $f(t)$.

The switch 24 is a current or voltage controlled device that connects the output of the attenuator 22 to the load 20 for a portion of the input cycle. The switch 16 is a similar device that connects the output of the differentiator 14 to the load 20 (via the upper switch contact) during a portion of the input cycle, and returns it to the return conductor 28 and the source (via the lower switch contact) for the remaining portion of the cycle. The timing cycles of these two switches 16 and 24 are so arranged that at a desired center frequency of operation, the average current through the load 20 or voltage across the load 20 is zero. As the frequency of the input signal from the source 12 is varied about this desired center frequency, the average value of the load current or voltage varies.

Figure 2:
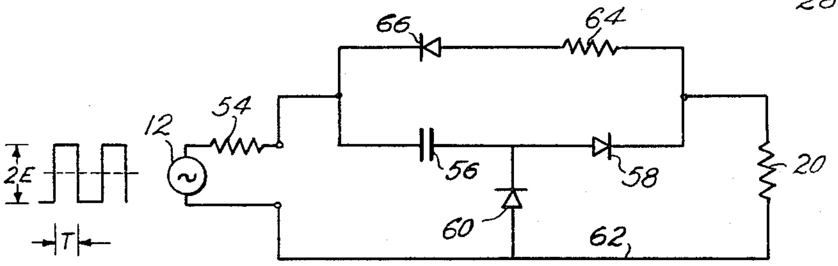
FIG. 2 is a wiring diagram showing one form of the invention, using a capacitor for differentiation.

In practice, switch 24 and switch 16 may be a combination of one or more diodes or rectifiers, or any other form of controlled switch. In FIG. 2 the source 12 and load 20 correspond to those shown in FIG. 1. The resistor 54 represents the internal resistance of source 12. A portion of the input is led through a differentiator, which in this case is a capacitor 56. This is followed by a diode 58, and another diode 60 is connected to the common return 62. The other portion of the input runs through an attenuator, in this case a resistor 64, in series with a diode 66, this being polarized oppositely to the diode 58.

For a negative half wave, the diode 66 is closed and the attenuated or bucking half wave is supplied to the load 20. At the same time, the diode 60 also is closed, permitting the capacitor 56 to charge, it being negative on the left and positive on the right. The charging current through the capacitor is proportional to the derivative of the input voltage.

In the positive half cycle, the diode 66 is open and there is no supply of attenuated or bucking wave to the load 20. The diode 60 is open but diode 58 is closed, and the capacitor 56 discharges abruptly into the load 20. This capacitor current which now flows through load 20 is proportional to the derivative of the input voltage.

The circuit of FIG. 2 is a specific embodiment of the block diagram of FIG. 1. It assumes a voltage source or low impedance source and that the circuit is working into a low impedance load. The terms positive and negative are used in a relative sense, and may be reversed. The resistor 64 may precede or follow the diode 66.

The operation of this circuit where the voltage source 12 supplies a frequency modulated square wave is described below. Considering the circuit of FIG. 2 more precisely, the source 12 is an ideal generator having an internal impedance 54. This ideal generator 12 produces a square wave of peak to peak amplitude 2E and half period T, and zero average value. The load 20 is assumed to be a resistor. It is well known in the field of electrical engineering that the current through a capacitor is equal to $C(de/dt)$ where C is the capacity of the capacitor involved, $e$ is the voltage across the capacitor and $(de/dt)$ is the derivative of the voltage with respect to time.

Assume initially that the source impedance 54 is zero. Then during a negative half cycle two events will occur. A current will flow upwards through the load equal in magnitude to voltage E divided by the sum of resistors 64 and 20. The average value of the current over the whole cycle will be one-half its value during the negative half cycle because during the positive half cycle diode 66 will become an open circuit and will prevent current flow through resistor 64.

At the same time that this current is flowing through resistor 64, diode 66, and the load 20, the capacitor 56 is being charged through diode 60 to a peak voltage of minus E. As long as resistor 20 is so small that the voltage across it via the resistor 64, diode 66, branch does not exceed the turn-on voltage of diode 58, this diode remains off, and the only output reaching the load 20 during this half cycle is that which arrives via the attenuator branch. If the load resistor 20 is not sufficiently small then diode 58 may still be held in the off position by the addition of several more components to the circuit.

During a positive half cycle the resistor 64, diode 66 branch is effectively open circuited by diode 66. Capacitor 56 is now connected via diode 58 in series with the load resistor 20. Capacitor 56 loses its negative voltage E and is recharged through the load resistor 20 and diode 58 to a voltage E. This process causes an exponentially decaying pulse of current, whose area is proportional to the derivative of the input voltage, to flow downwards through load resistor 20. The current has a peak value of 2E divided by the sum of the resistances 54 and 20 and the "on" resistance of the diode 58. As long as the half period T is greater than four or five times the time constant (the product of the capacitance 56, and the aforementioned sum of resistances 54 and 20 and the "on" resistance of the diode 58) of the circuit, this positive current pulse will have an average value over a whole cycle of ($2ECf$), "$f$" being the fundamental frequency of the input signal from the source 12. Numerically $f$ is equal to the recirpocal of the period, 2T. C is the capacitance of capacitor 56.

Since the average value of the current during the negative half cycle is independent of the frequency, while the average value of the current during the positive half cycle is a function of the frequency, it is possible to adjust the resistor 64 and capacitor 56 so that at any desired center frequency, $f_o$, the average current through the load resistor 20 is zero. Those versed in the art will see that when resistance 64 is large compared to resistors 54 or 20, and when the aforementioned relationship between circuit time constants and half periods are met, then $$f_o = 1/4CR \quad (1)$$

and $$dI/df = 2EC \quad (2)$$

in which R is the resistance of resistor 64, I is the average current through the load resistor 20, and $(dI/df)$ is the derivative of the average current with respect to frequency. The $(dI/df)$ term may also be spoken of as the slope of the average current versus frequency curve.

Since the formula for the center frequency, $f_o$ is independent of the amplitude E, the center frequency will be independent of the amplitude of the incoming signal, and also at the center frequency there will be no variation in the output if the incoming signal does vary in amplitude, for example, if it is amplitude modulated.

From examination of Equations 1 and 2 above it will be seen that if it be desired to vary the center frequency $f_o$, without varying the slope of the demodulation curve, it is only necessary to change or vary the resistor 64 in the upper branch of FIG. 2. This may be done not only manually, but automatically if desired, and the resistor used may be a special component such as a photo-resistor or other such sensor. If it be desired to vary the slope then either the amplitude E, or the capacitance 56 may be varied.

Several minor modifications are possible that do not affect the basic operation. For example the basic switching operation performed by switch 16 in FIG. 1 may still be obtained if diode 60 (FIG. 2) is replaced by a resistor, while diode 58 is retained. In this case as long as the time constant formed by the product of the capacitance of capacitor 56 and the sum of the new resistor and resistor 54 is less than four or five T the operation will be unchanged. It is also possible to retain diode 60 by replacing diode 58 by a resistor. In this case the new resistor would need to be substantially larger than the load resistor 20 to prevent loss of load current during the attenuation portion of the cycle. At the same time the previously defined time constant condition must still be met. The new resistor replaces the "on" diode resistance of diode 58 in the time constant calculation. The combination of these two conditions limits the upper frequency at which this version of the circuit may be used to a value substantially below that of the other two versions, but does not prevent its satisfactory operation within its allowable frequency range.

Figure 6:
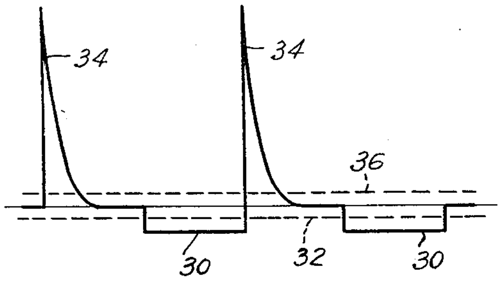
FIGS. 6, 7 and 8 show three wave forms explanatory of the effect of a change in the frequency of a square wave input.

The operation of the circuit of FIG. 2 may be explained with reference to FIGS. 6, 7 and 8 of the drawing, which assume that the input is a square wave. In FIG. 6 the frequency is at the center frequency of the modulation. The negative of balance side consists of square half waves 30 having an average represented by the dotted line 32.

The differentiated wave is represented by the positive pulses 34 having a D.C. average indicated by the dotted line 36. The positive value of line 36 equals the negative value of line 32 so that there is a balanced or zero output at the center frequency. (The polarities are relative, and may be reversed.)

Figure 7:
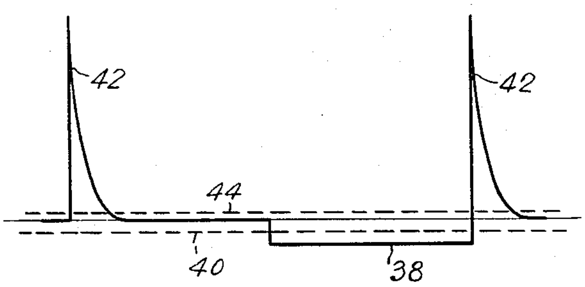

FIG. 7 assumes a lower frequency. The balance wave or attenuated wave is shown at 38, with an average value represented by dotted line 40. The differentiated wave is shown at 42 with an average represented by dotted line 44. It will be seen that the average 40 in FIG. 7 is the same as the average 32 in FIG. 6; but that the average 44 in FIG. 7 is much smaller than the average 36 in FIG. 6. This is so because there is greater spacing or fewer number of pulses 42.

Figure 8:
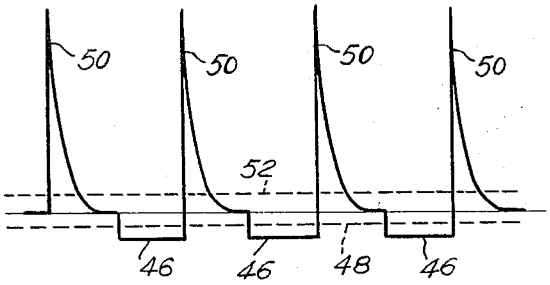

FIG. 8 represents a frequency higher than the center frequency. The attenuated rectified wave is shown at 46 with an average indicated by dotted line 48. The differentiated rectified wave is shown at 50, with an average indicated by dotted line 52. The average line 48 is substantially the same as in FIGS. 6 and 7; but the average line 52 has a greater value by reason of the smaller spacing or greater frequency of the pulses 50.

Figure 9:
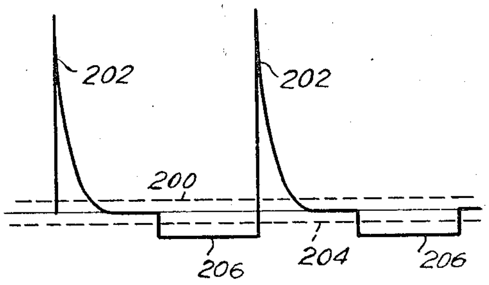
FIGS. 9, 10 and 11 show three wave forms explanatory of the effect of a change in the amplitude of a square wave input.
Figure 10:
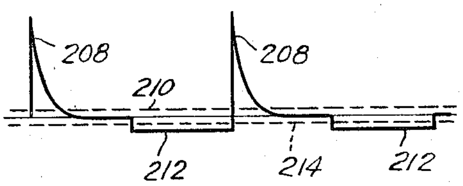
Figure 11:
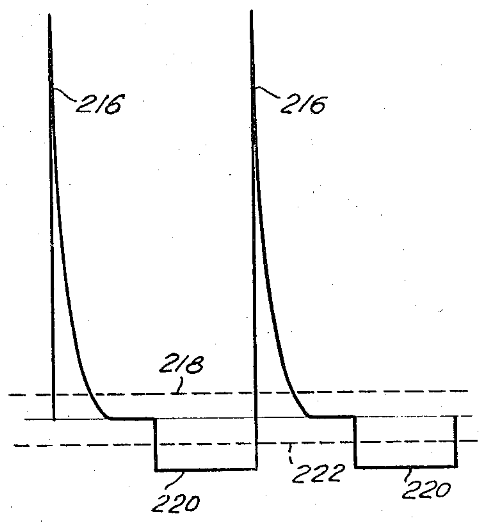

One important advantage of the present demodulator is that the balance of the circuit at the center frequency is independent of changes in amplitude of the input wave. This feature may be described with reference to FIGS. 9, 10, and 11, in which FIG. 9 corresponds to FIG. 6, and it is again assumed that the input wave is a square wave. FIGS. 9, 10, and 11 all have the same frequency, which is the center frequency, but they have changes in amplitude.

In FIG. 9 the amplitude is the same as in FIG. 6, and the average 200 of the positive wave 202 is balanced by the average 204 of the negative wave 206. In FIG. 10 the amplitude of the input wave has dropped to about one-half value. The average of the positive wave 208 drops correspondingly, as shown by the dotted line 210. The average of the negative or bucking wave 212 similarly drops, as shown by the dotted line average 214. Thus balance is maintained.

In FIG. 11 it is assumed that the amplitude of the input wave has about doubled compared to that shown in FIG. 9. The average of the positive wave 216 is appropriately doubled, as shown by the dotted line average 218. At the same time, the amplitude of the negative half waves has similarly doubled, as shown at 220, thereby doubling their average, as shown by dotted line 222. Thus, the balance at center frequency is maintained despite the amplitude changes represented by FIGS. 9, 10, and 11.

Figure 3:
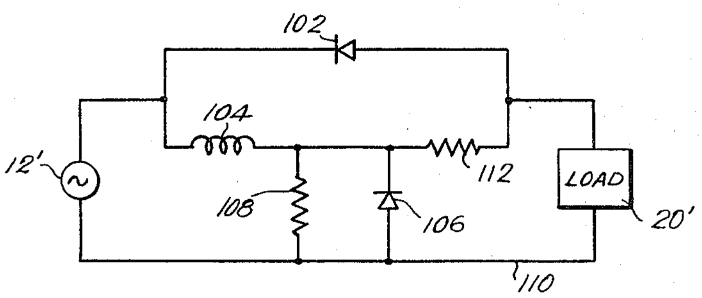
FIG. 3 is a wiring diagram showing another form of the invention, using an inductor for differentiation.

The differentiation may be performed by an inductor instead of a capacitor, and a circuit which is approximately the "dual" of FIG. 2 is shown in FIG. 3. Here the source, which is a current source, is indicated at 12' and the load at 20'.

The upper branch of the parallel circuit has a diode 102. The differentiator is the inductor 104, and is followed by a rectifier or diode 106 which is so polarized relative to diode 102 that it is effective as later explained. A resistor 108 connects inductor 104 to the return line 110, and another resistor 112 is connected between diode and the load 20'.

Assuming a square wave input, in the positive half cycle, the diode 102 is open and the diode 106 is open. Current flows through inductor 104 and resistor 108, thereby developing a potential across the load 20', which corresponds to an attenuated portion of the input wave and provides a "balance" feed to the load.

When the input wave is negative, the diodes 102 and 106 are closed. There is a reverse flow of current through diode 106 and inductor 104, and the voltage across the inductor 104 is proportional to the derivative of the current through it. This voltage across the inductor 104 is transmitted through diode 102 to the load 20'.

Thus, the operation is much the same as that described for FIG. 2, and the wave forms shown in FIGS. 6 through 11 are applicable, even though it is not obvious that this dual circuit fits the block diagram of FIG. 1. The diodes may open or close simultaneously and yet the net result with a square wave input is that the derivative is used in one polarity, and the balance wave is used in opposite polarity.

The circuit of FIG. 3 assumes a current source or high impedance source, and a high impedance load.

Figure 4:
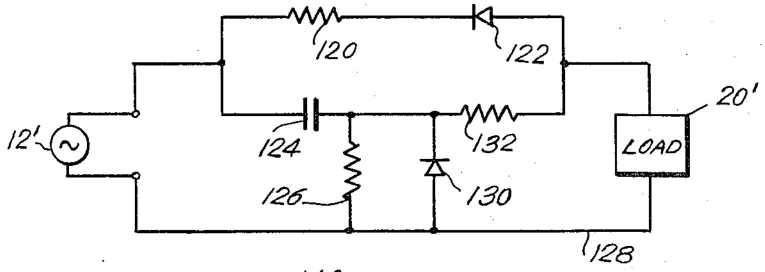
FIG. 4 is a wiring diagram of a further form of the invention using a capacitor for differentiation.

In FIG. 4 we show a circuit using a capacitor as a differentiator, and it assumes a voltage source or low impedance source, as in FIG. 2 feeding into a high impedance load 20′. The attenuator or bucking branch comprises resistor 120 followed by a diode 122. The diode may precede or follow the resistor.

The rectified and attenuated half waves are supplied to load 20′ for balance or bucking purposes. The input is also led to capacitor 124, the other side of which is connected by resistor 126 to the common return 128. A second diode is indicated at 130, connected in shunt with resistor 126. A series resistor 132 leads to the load 20′. In this case, the resistor 132 is smaller in resistance value than the load 20′, and the resistor 126 is small in value compared to the sum of resistor 132 and load 20′.

In a negative half cycle, the diode 122 is closed and the output is connected to load 20′. The diode 130 is also closed, so that resistor 132 is connected in parallel to the load. The capacitor 124 is being charged through diode 130.

During a positive half cycle, the diode 122 is open and the diode 130 is open, whereupon the capacitor 124 abruptly discharges and charges up again in opposite direction. There is a flow of current, which is proportional to the derivative of the input voltage, through resistor 132 to the load 20′. This provides the differentiated and rectified portion of the input wave form as previously described.

Note that the two diodes are effective as switches in delivering the derivative position half cycles and negative balance half cycles to the load, even though they open and close together.

If the input is a sine wave instead of a square wave, the operation may be described with reference to FIGS. 12, 13 and 14. In the sine wave case the derivative and balance portions of the load signal overlap in time hence one does not have the clearcut separation of the square wave case. For example in FIG. 12 the attenuated portion of the load voltage is shown by the half sine wave indicated by line 74 (shown as partially solid and partially dotted) while the derivative portion of the load voltage is indicated by the line 70 (shown as partially solid and partially dotted). Since these waves overlap, the load voltage, which is the algebraic sum of the lines 70 and line 74, is shown by the line 78. In FIGS. 13 and 14 similar relationships exist, the algebraic sum being indicated at 80 in FIG. 13 and at 90 in FIG. 14.

Figure 12:
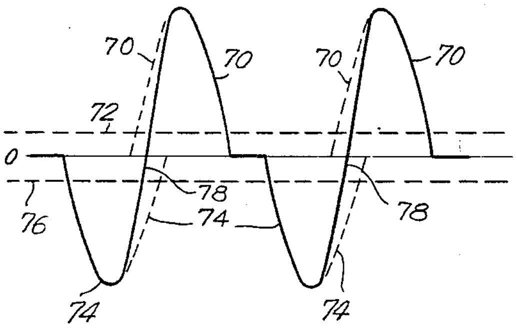
FIGS. 12, 13 and 14 show three wave forms explanatory of the effect of a change in the frequency of a sine wave input.
Figures 13, 14, 15:
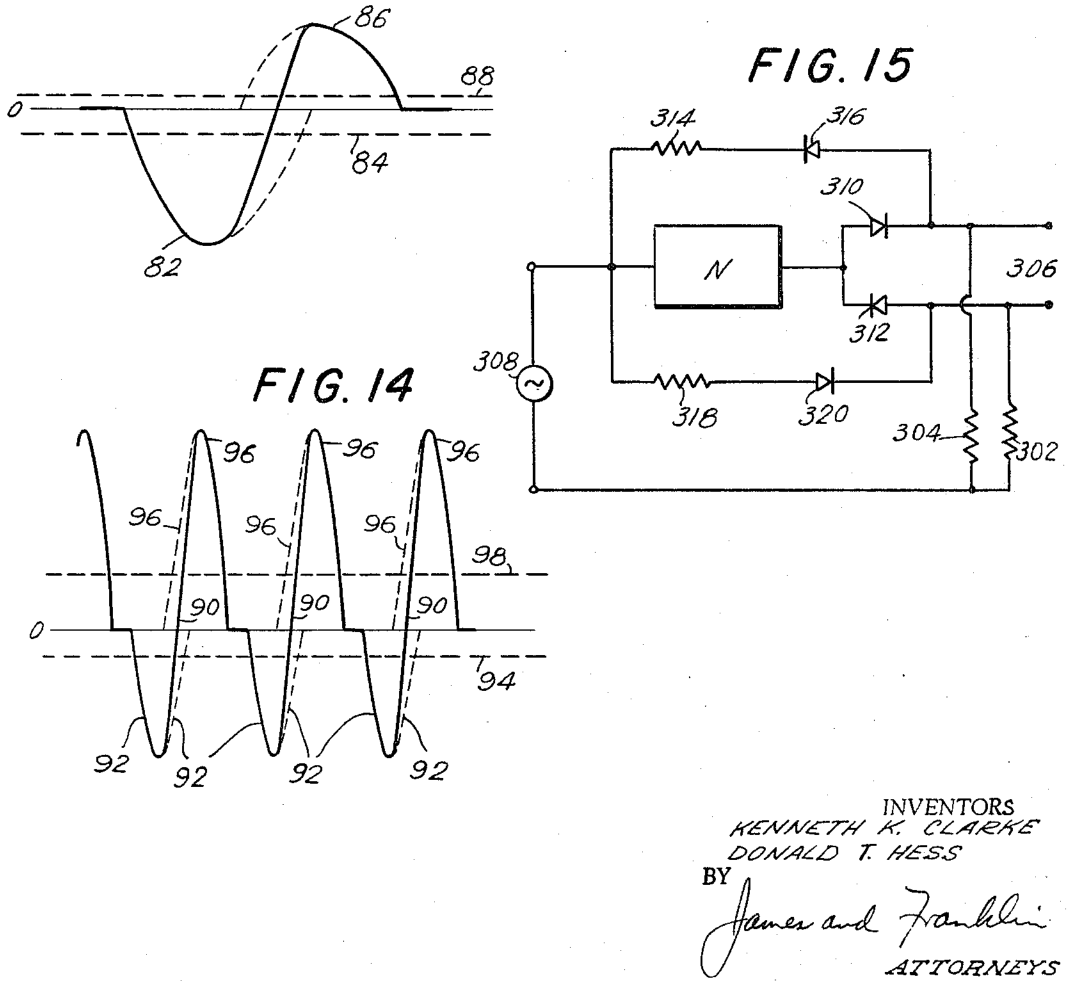
FIGS. 15 and 16 show diagrams for symmetrical or push-pull circuits utilizing our invention.

At the center frequency, illustrated in FIG. 12, the derivative half waves are represented at 70, with an average at 72. The balance half waves are represented at 74 with an average at 76. The average is balanced at the center frequency, there being zero output.

When the frequency drops, the situation is that shown in FIG. 13 in which the attenuated or balance half waves are represented at 82 with an average at 84. The derivative half waves are indicated at 86 with an average at 88, this being smaller than the average 84.

When the frequency is higher than the center frequency, the situation is that illustrated in FIG. 14. Here the attenuated or balance half waves 92 have an average represented by line 94. The derivative half waves 96 have an average represented by line 98. The average 98 has a value higher than the average 94. Thus, the modulation appears as a variable average value in the load, as is desired.

The differentiator may be more complex. For example in FIG. 5 we show a circuit in which a capacitor and an inductor connected in series are used for differentiation. A combination of capacitor and inductor in series is a differentiator, but differs from either capacitance or indistance alone in that the combination is usefully operative over only a narrow range or band of frequencies, instead of over a wide frequency range.

Figure 5:
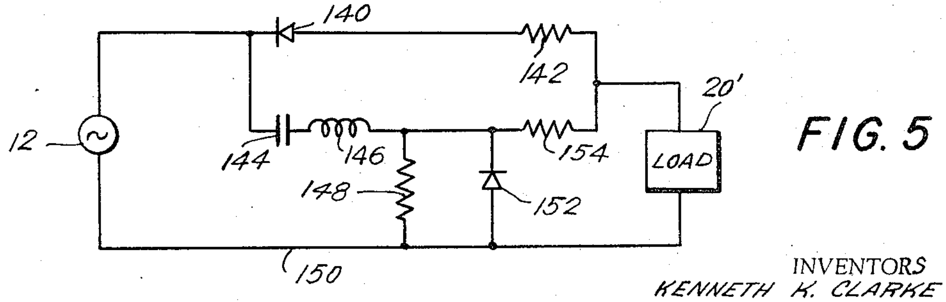
FIG. 5 is a wiring diagram showing still another form of the invention, using a combination of capacitor and inductor for differentiation.

FIG. 5 is used between a voltage source or low impedance source 12 and a high impedance load 20′. A portion of the input is supplied through diode 140 and resistor 142 to the load 20′. Another portion is supplied to capacitor 144 in series with inductor 146, which are connected through a resistor 148 to the return line 150. A diode 152 is connected in shunt with resistor 148, and a resistor 154 is connected in series with the load. The resistor 154 is small in value compared to the load 20′, and the resistor 148 is small in value compared to the sum of resistors 154 and load 20′.

Assume the input to be a sine wave. In the negative side, the diode 140 is closed and the attenuated half wave is fed to the load 20′. The input signal is across the differentiator circuit 144, 146 and resistor 148 and diode 152. Resistor 148 is low in impedance compared to the LC circuit 144, 146. Over a band of frequencies the LC circuit provides a current which is the derivative of the input voltage.

When the derivative current wave is positive, the positive side of the derivative wave flows through the resistor 148, the diodes 140 and 152 being open. A voltage is developed across the resistor 148, which in turn is transmitted through resistor 154 to the load 20′.

When the derivative wave is negative, the diode 152 is closed and it short-circuits the resistor 148. The flow through diode 152 terminates or prevents any flow from the LC circuit to the load 20′.

In addition to simply combining any two similar forms of any of the previous circuits, one can double the output voltage, obtain a push-pull output from a single differentiating network, and obtain the advantage of presenting a constant impedance to the input power source during both halves of the input cycle. In the single ended versions of our circuit previously described the output from the differentiator or differentiating network was fed to a single load resistor during one-half the cycle, and was discarded during the remainder of the cycle, and the bucking voltage path also was active during only one-half of a cycle.

In one push-pull version the output of the differentiating path is fed alternately to one and then the other of two load resistors, and the bucking voltage path also is always active and feeds alternately to the two load resistors, such a circuit is shown in FIG. 15 of the drawing, which is a balanced version of the basic FM demodulator.

Average voltages which are proportional to frequency appear across resistors 302 and 304. The sum of these two voltages appears between the terminals 306 to yield essentially twice the voltage vs. frequency slope that would be obtained with a single-ended device.

To understand the operation of the circuit consider a sine voltage wave from source 308. This voltage is applied to any desired differentiating network N whose output current is proportional to the derivative of the input voltage. During the positive half cycle of the derivative, diode 310 closes, diode 312 opens, and the positive half cycle of the derivative flows through resistor 304 to develop a voltage across the resistor 304. On the negative half cycle of the derivative the current flows through resistor 302, developing a voltage similar to that developed across resistor 304, but of opposite polarity.

Current also flows through the bucking branch consisting of attenuator resistor 314 and diode 316. Diode 316 closes, however, only for the negative half cycle of the input voltage waveform, and hence delivers attenuated current to resistor 304 only during the negative half cycle of input voltage. Similarly the bucking branch consisting of attenuator resistor 318 and diode 320 delivers current to resistor 302 which is proportional to the positive half cycle of the input voltage, and develops a voltage across resistor 302.

Both resistors 302 and 304 develop voltages across them which are similar to those shown in FIGS. 12, 13 and 14. The voltage across terminals 306 represents the algebraic sum of these two voltages, and its average value is proportional to changes in frequency from a prescribed center frequency $f_0$. The output is effectively the difference of the voltages across the two load resistors, and these voltages are always of opposite polarity, so that the difference is twice the magnitude of either output alone.

For ease in adjustment the two resistors 314 and 318 may be combined in whole or in part. As in the single-ended circuits the center frequency may be adjusted by varying the size of these resistors.

Figure 16:
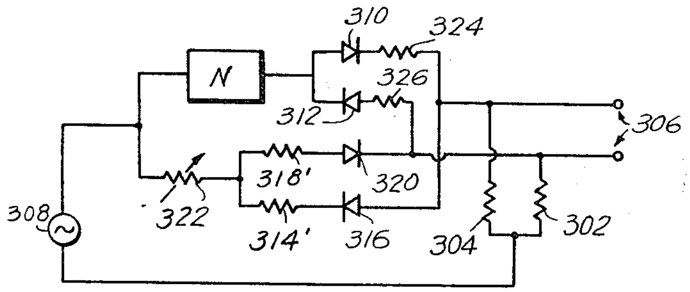

FIG. 16 illustrates this modification of the push-pull output composite circuit. Like numerals have been used for like parts. In this version of our circuit the center frequency of the discriminator can be varied by varying resistor 322 alone. It corresponds to a simultaneous equal variation of resistors 314 and 318 in FIG. 15. If it be desired to partially retain independent resistors, the resistors 314' and 318' are provided in FIG. 16.

Also to obtain optimum values of output voltage or linearity an additional resistor may be added in series with either or both diodes 310 and 312. These are shown at 324 and 326.

Figure 17:
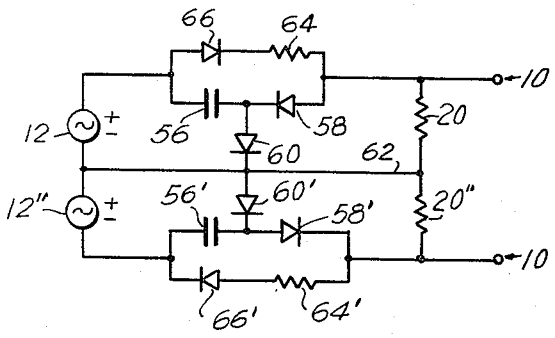
FIG. 17 is a wiring diagram showing a composite connection for our invention based upon the circuit of FIG. 2.
Figure 18:
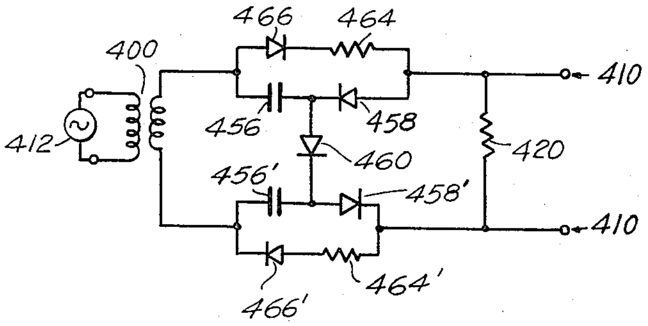
FIG. 18 is a wiring diagram showing a composite circuit for our invention derived from the circuit of FIG. 17.
Figure 19:
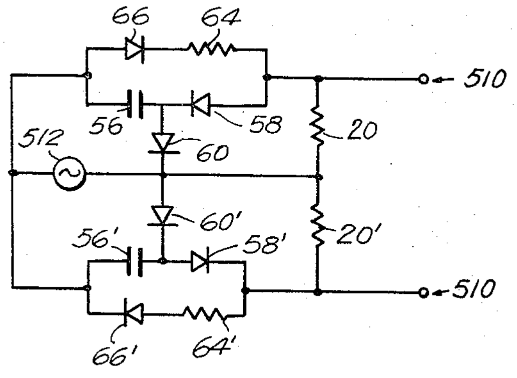
FIG. 19 is a wiring diagram showing another composite circuit for our invention that is also derived from FIG. 17.

In addition to the composite circuits of FIGS. 15 and 16, various other ways of combining the single circuits illustrated by FIG. 1 through FIG. 5 are possible. FIGS. 17, 18 and 19 illustrate several of these, all based on the circuit of FIG. 2. It should be understood that the other single circuits (FIGS. 3–5) also may be combined in a similar fashion.

The circuit of FIG. 17 may be thought of as being built up of two complete circuits of the type shown in FIG. 2. Like numbers are used for like parts. These two circuits would have a common return lead 62 while the polarity of diodes 60', 58', and 66' of the lower version would all be reversed in direction from their counterparts in the upper circuit. The new source 12'' is equal in magnitude and opposite in polarity to the upper source 12. In practice, the combination of two equal magnitude, opposite polarity sources might be obtained by using a center tapped transformer to replace the two sources. Each half of the composite circuit operates in a fashion identical to that already described for FIG. 2. Since the output is taken across terminals 10 it is twice that of a single circuit.

FIG. 18 illustrates a circuit that is derived from FIG. 17 by combining the two voltage sources 12 and 12'' to form a single source 412. This is shown coupled to the circuit by a transformer 400, and such a coupling is possible but is not essential to the operation of the circuit. FIG. 18 also differs by combining the two diodes 60 and 60' to form a single diode 460; by combining the two load resistors 20 and 20'' to form the single load resistor 420; and by suppressing the common return lead 62 in FIG. 17.

Another circuit that is derivable from FIG. 17 is shown in FIG. 19. This is identical to FIG. 17 except that instead of the two sources 12 and 12'' that drive the two halves of FIG. 17 in an out-of-phase fashion, the circuit of FIG. 19 has a single source 512 that drives the two inputs in parallel. Individual halves of the circuit still operate in the fashion described for FIG. 2. However the output across terminals 510 is again twice that expected from a single circuit.

While diodes are shown in FIGS. 2, 3, 4, 5, 15, 16, 17, 18 and 19, it is to be understood that other voltage or current-controlled switching devices, e.g. transistors, may be substituted. In FIG. 15 there are no diodes equivalent to diodes 60 or 106 or 130 or 152 previously shown in FIGS. 2–5 respectively. There is nothing equivalent to the down contact of switch 16 in FIG. 1, because there is no discard of a half cycle, and instead in FIG. 15 the said half cycle is utilized to feed the other half of the push-pull circuit. The same applies to FIG. 16.

FIG. 20 corresponds to FIG. 1, the input source being indicated at 612, the attenuator by block 622, the differentiator by block 614, and the load by the RC circuit 620. The switching means for the attenuator is a PNP transistor 624, and the switching means for the differentiator is an NPN transistor 616. It will be understood that the types of transistor may be reversed, the important thing being that they be oppositely conductive. The transistors are biased by means of a bias source here represented by batteries 630 and 632, and these are appropriately and therefore oppositely polarized. The bias voltage is selected to be higher than the anticipated load voltage. The bias source may be connected in the output or collector circuit, but it is preferred to apply it to the base of the transistor so that the output circuit 620 can be grounded, as here shown.

The transistor 616 is shunted by a diode 660 which corresponds in function to the diode 60 shown in FIG. 2. It is polarized oppositely to the emitter circuit of transistor 616. The transistor 624 is also shunted by a diode 634, but this has an altogether different purpose which is next explained.

Figure 21:
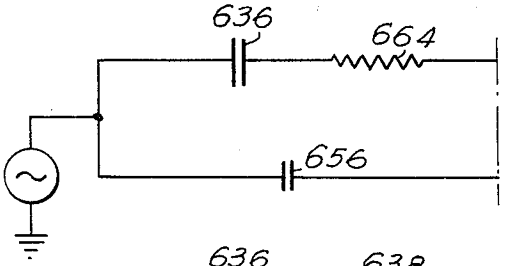

Referring to FIG. 21, the attenuator in this case is a resistor 664. To prevent the D.C. bias source 630 from being connected directly back to the input 612 through the resistor 664, a blocking capacitor 636 of large capacitance is provided in series with resistor 664. The capacitor is large enough to readily transmit the signal, while blocking the D.C. bias.

The use of blocking capacitor 636 raises a problem in that it would be charged in one direction, but not discharged or "reset," but by using the diode 634, polarized in proper direction, the blocking capacitor 636 is permitted to discharge or reset.

In FIG. 21 the differentiator is a capacitor 656. In FIG. 22 the differentiator again is a capacitor 656. The attenuator is an inductor 638. The inductor raises the same problem as the resistor 664 in FIG. 21, and therefore a blocking capacitor of large size is introduced at 636. To permit reset of the blocking capacitor the diode 634 (FIG. 20) is again employed.

In FIG. 23 the attenuator again is a resistor 664, and is connected in series with blocking capacitor 636. The differentiator is a parallel resonant circuit made up of an inductor 640 and a capacitor 642, these being resonant at a frequency offset from the desired center frequency, it being understood that one sloping side or the other of the resonance curve is employed. A blocking capacitor 637 then is needed. The tuned circuit 640, 642 employs parallel resonance, but a series resonant circuit also can be employed, as was indicated above by the circuit 144, 146 in FIG. 5.

Referring now to FIG. 24, the attenuator again is a resistor 664, and is connected in series with a blocking capacitor 636. The differentiator in this case is a piezo-electric device 644, typically a ceramic element, and here again the resonance frequency is selected to be at one side of the desired frequency range. The situation is much the same as when using the tuned circuit of FIG. 23, except that the slope of the resonance curve is steeper.

Figure 25:
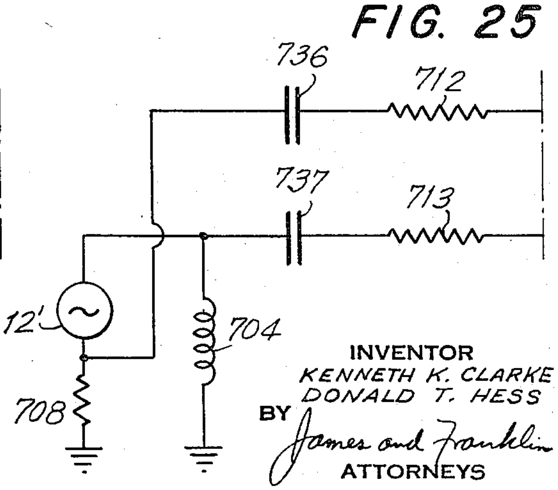

FIGS. 21–24 correspond generally to the left end of FIG. 2, and they assume as in FIG. 2 that the driving source 12 has a low impedance. FIG. 25 assumes that the driving source 12' is a high impedance source, and therefore is somewhat analogous to FIG. 3. The differentiating inductor 704 in FIG. 25 corresponds to the inductor 104 in FIG. 3. The resistor 708 in FIG. 25 corresponds to resistor 108 in FIG. 3, and helps develop the bucking wave. This is fed to the output load 620 (FIG. 20) via blocking capacitor 736 (FIG. 25), resistor 712, and transistor 624 (FIG. 20). Resistor 712 is somewhat comparable to resistor 112 in FIG. 3, and may be varied to adjust the center frequency. The differentiated signal developed across inductor 704 is fed to the output load by way of blocking capacitor 737, resistor 713, and transistor 616 (FIG. 20). Resistor 713 (FIG. 25) is necessary to provide isolation between inductor 704 and the low impedance of transistor 616 (FIG. 20).

FIGS. 26 through 30 illustrate the use of types of composite differentiator circuits as the differentiating element of the FM detector. Here again each circuit is assumed to be followed by transistor switching means such as is shown in the right hand part of FIG. 20.

In FIG. 26 the attenuator again is a resistor 864, and is connected in series with a blocking capacitor 836 to the voltage source 812. The differentiator branch is made up of a combination of a resistor 858 and a properly terminated delay circuit 856, this combination being connected in series with a blocking capacitor 859. Proper termination is needed to avoid reflection or echo. An actual embodiment of the delay circuit 856 may consist of a suitable length of delay line with either one or two terminating resistors. A piece of line is simpler than the use of a network of components.

Figure 26:
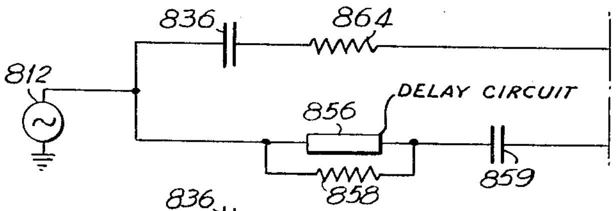

It is well known, as has been pointed out in the third paragraph after the brief description of the figures, that the difference between a function and a delayed version of the function is proportional to the approximate derivative of the function. It is apparently not well known, although once pointed out it will be apparent to those well versed in the art, that by imposing the same restrictions necessary in the function-delayed function-difference case then it is possible to obtain envelope variations proportional to the differential of a signal of the type $$E \cos [w_0 t + m(t)]$$

by taking the sum of this signal and a delayed version of the signal. It is the resulting "sum" version of an approximate differentiator that is illustrated in FIG. 26.

If $m(t)$ is given by $$(\Delta w/\mu) \cos \mu t$$

where $\Delta w$ is the radian frequency deviation, and $\mu$ is the radian modulating frequency, then the restrictions necessary for a satisfactory realization of approximate differentiation in the envelope sense by either the sum or difference approach are that $$\Delta w t_0 \leq 0.4$$

$$\mu t_0 \leq 0.4$$

and that $$w_0 t_0 + \theta = N\pi/2$$

where N is any odd integer, and $\theta$ is any constant phase shift caused by the delay circuit. If $\theta$ is zero and $N=1$ then $w_0 = \pi/2t_0$ and the previous two restrictions may be written in the form $$\Delta w/w_0 \leq 0.8/\pi$$

and $$\mu/w_0 \leq 0.8/\pi$$

Since commercial FM signals are currently transmitted with maximum $\Delta w/w_0$ ratios of less than 0.001 and $\mu/w_0$ ratios smaller by another factor of five, the restrictions stated may be tightened by a large amount for many practical applications. Such a tightening will reduce the departure of the approximate differentiator from its ideal properties, and will reduce system distortion.

Figure 27:
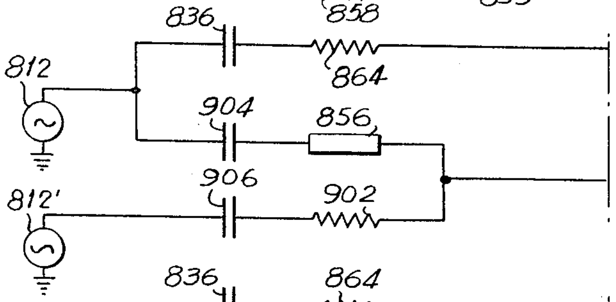

In FIG. 27 an additional voltage supply 812' that is always exactly 180° out of phase with supply 812 has been added. The attenuator branch again is made up of resistor 864 and blocking capacitor 836. The differentiator function now is performed by the combination of the properly terminated delay element 856 and a resistor 902 which is analogous to the resistor 858 in FIG. 26. Capacitor 904 and capacitor 906 are blocking capacitors. In this figure (and in most succeeding figures) the inputs to the delay circuit and its associated resistor are subtractive, instead of additive as in FIG. 26.

Figure 28:
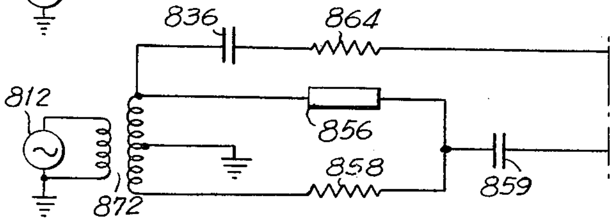
Figure 29:
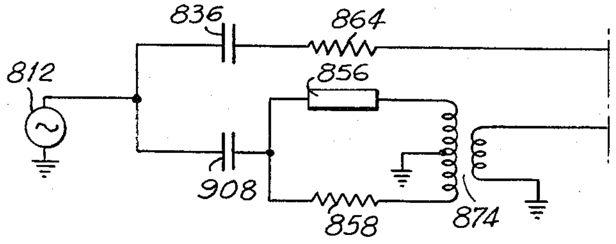

FIGS. 28 and 29 illustrate the use of a phase splitting transformer 872 or 874 to replace the out of phase voltage source 812' of FIG. 27. In FIG. 28 the transformer 872 is shown at the input side of the circuit, while in FIG. 29 the transformer 874 is shown at the output side of the differentiation branch.

In FIG. 28 the delay circuit 856, the resistor 858, and the blocking capacitor 859, correspond to those shown in FIG. 26. In FIG. 29 a blocking capacitor 908 is used at the input side of the differentiator branch.

Figure 30:
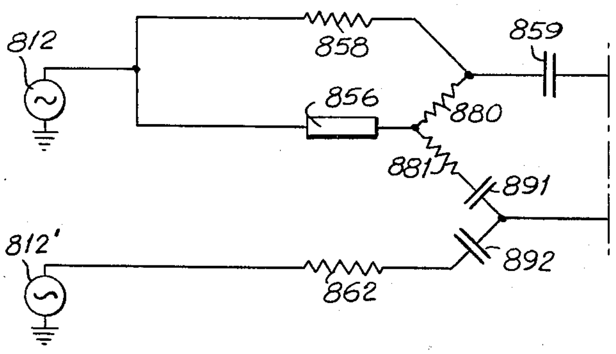

FIG. 30 illustrates a circuit in which the concepts of FIGS. 26 and 27 are combined so that each branch contains an approximate differentiator. There are two supplies 812 and 812' in phase opposition, as in FIG. 27. A single delay circuit 856 is shown to be terminated in two parallel resistors 880 and 881, and combined with a resistor 858 driven from the first voltage generator 812, and also combined with a resistor 862 driven from second or oppositely phased generator 812'. Capacitors 859, 891 and 892 are blocking capacitors.

Again instead of a separate out-of-phase generator 812' as shown in FIG. 30, one could employ a transformer as illustrated at 872 in FIG. 28 to obtain the drive for the resistor 862 (FIG. 30).

In the circuits illustrated by FIGS. 26 through 30 the center frequency should be at any of the radian frequencies $w_0$ that satisfy the equation $w_0 t_0 = N\pi/2$.

In this equation $t_0$ is a constant known as the delay of the circuit, and N is any odd integer. In each case appropriate resistors may be combined to achieve this operation. As an example, in FIG. 30 one would choose resistors 880 and 881 to be equal, and each twice the desired terminating resistance for the delay element 856. One would also choose resistors 858 and 862 equal to each other and also equal to the resistors 880 and 881.

The diodes 634 and 660 shown in FIG. 20 are used in each of FIGS. 21–30. They can be replaced by resistors having an appropriate resistance value. This value must be high enough not to excessively shunt the transistor, and yet must be low enough to provide the desired reset of the blocking capacitor. However, it is easier and more efficient to employ diodes, and the use of such diodes therefore is preferred.

The transistors may be of either the silicon type or the germanium type, and the same applies to the diodes 634 and 660, but if the transistors are of the silicon type it is preferred that the diodes also be of the silicon type, and if the transistors employ germanium it is preferred to use germanium diodes.

The showing in FIGS. 6 through 14 of the drawing is generally applicable to the transistor circuits, but with transistors the curves represent current flowing into the output 620 (FIG. 20) whereas with diode switching instead of transistor switching the curves of FIGS. 6–14 represent voltage across the output.

The main advantage of using the transistor circuits of FIGS. 20–30 is the isolation of the output circuit from the input circuit. This makes possible large output amplitude, limited only by the bias voltage and by the breakdown voltage of the transistor. It is also possible to change the output slope without changing the center frequency, by making changes in the output load alone, without requiring any changes in the attenuator or the differentiator circuitry.

The use of transistors makes it possible to shunt the output impedance with a filter capacitor, such as the capacitor C in FIG. 20. In general, the use of transistors expands the practical useful field of the invention, compared to the use of diodes.

Another advantage of transistor switching is that the input impedance presented to the driving source is the same on both halves of the cycle, without using push-pull circuitry as in FIGS. 15–19, or other special balancing circuitry that would be needed for this refinement when using diode switching.

As one example of quantitative values which may be employed, in the circuit of FIG. 2 the capacitor 56 may have a value of 5000 picofarads; the resistor 54 may have a value of 300 ohms; and the resistor 64 may have a value of 5000 ohms. The low impedance load 20 is assumed to have a value of say 900 ohms. This circuit operates at a center frequency of 6345 cycles which is a relatively low frequency, but one considerably used in connection with telemetry systems.

As another example of quantitative values which may be employed, reference may be made to the circuit of FIG. 4 in which the capacitor 124 has a value of 0.01 microfarad; the resistor 120 has a value of 22K ohms; the resistor 126 has a value of 4700 ohms; and the resistor 132 has a value of 10K ohms. The load is assumed to have an impedance of 40K ohms. This circuit operates with a center frequency of 1824 cycles per second.

As still another example of quantitative values which may be employed, reference may be made to the circuit of FIG. 21. Assume a center frequency of about one megacycle, with a peak frequency deviation of plus or minus 800 kc. The system is assumed to require a minus three db modulation band width of eight kc. Assume a sinusoidal input signal of two volts R.M.S. Assume also an output swing of plus or minus nine volts. In such case the capacitor 656 may have a value of say 1,000 picofarads. The attenuating resistor 664 may have a value of say 150 ohms. The blocking capacitor 636 may have a value of say 0.1 microfarad. The bias batteries would each have a magnitude of say 12 volts. The output load might correspond to a resistance of 2,000 ohms with a shunt capacitance of 0.01 microfarad. The transistors would be chosen to have a collector-to-base junction breakdown voltage greater than 12 volts, and to have an output impedance which is large relative to the load resistance, for example 20,000 ohms.

As yet another example of quantitative values which may be employed, reference may be made to the circuit of FIG. 30. Assume a center frequency of one megacycle, with a peak frequency deviation of plus or minus 75 kc. The system is assumed to require an output minus three db modulation bandwidth of 15 kc. Assume also a maximum output swing of plus or minus one volt and a driving voltage of 3.53 volts R.M.S. In such a case the delay circuit 856 may consist of a piece of delay cable with a delay of 0.25 microsecond, and terminating resistors 880 and 881 of say 2400 ohms each. The resistors 858 and 862 would also have values of 2400 ohms. The blocking capacitors 859, 891, and 892 may have values of say 0.1 microfarad. The bias batteries (630 and 632 in FIG. 20) may have magnitudes of say twelve volts each. The output load 620 (FIG. 20) might correspond to a resistance of say 2900 ohms with a shunt capacitance of 3600 picofarads. The transistors would again be chosen to have collector-to-base junction breakdown voltages greater than 12 volts, and to have an output impedance which is large relative to the load resistance, for example 20,000 ohms or more.

The term "attenuation" has been used, but it is not strictly appropriate, particularly if the feed is from a current source to a voltage load or from a voltage source to a current load. Speaking more accurately, one might refer to conversion of a part of the signal to another wave which has the same wave shape, and one side or polarity of which has the desired average value which is independent of frequency, and which serves to balance the average value of the derivative wave, at the center frequency.

Figure 22:
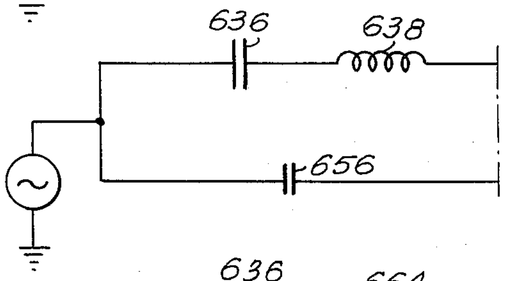
Figure 23:
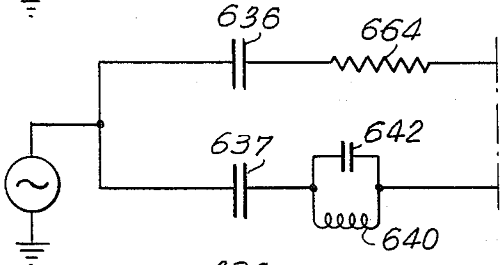
Figure 24:
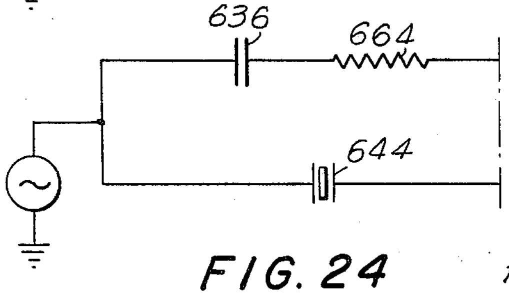

This independence of frequency does not apply to the inductive attenuator shown in FIG. 22, nor to the circuit shown in FIG. 30.

In the case of FIG. 22 the amplitude of the bucking wave varies with frequency, and the discriminator characteristic is somewhat curved instead of straight, but a portion of the characteristic near the center frequency is substantially straight and therefore is usable. Although less linear, it has the advantage of being steeper, and therefore provides a larger output voltage for a given frequency deviation. In the case of FIG. 30 both branches again have amplitudes that vary with frequency. In this case one amplitude decreases with frequency in the same fashion that the other increases, so that the combination yields not only twice the output voltage, for the same frequency deviation, compared to the circuits of FIGS. 26–29, but also is more nearly linear than are these single-ended versions of circuits employing this delay line type of differentiator circuitry.

It is believed that the construction and operation of our improved demodulator, as well as the advantages thereof, will be apparent from the foregoing detailed description. It may be linear over a very wide band on either side of the center frequency. The center frequency can be shifted by means of a resistor, and the slope remains constant as the center frequency is shifted. It is not necessary to vary an inductor or capacitor. The method of operation is independent of the shape of the input carrier wave. The response at the center frequency is zero and therefore is independent of the amplitude of the carrier wave. When a limiter is used it is not necessary to follow it with a tuned circuit to restore a sine wave shape. Instead, the input can move directly from a limiter to the demodulator because the method of operation is independent of the shape of the carrier wave. The circuit does not require a transformer, and therefore makes possible microminiaturization, because most components other than a transformer can be miniaturized.

It will be understood that many different means may be employed to produce the effect of differentiation other than the capacitor, inductor, combination of a capacitor and inductor, or piezo-electric device that have been used as illustrative examples here. Instead of using all of the positive side or the negative side of the input, a fixed fraction may be used. A combination of delay circuit and resistor may be used for differentiation.

The invention has utility in communication systems, telemetry systems, speed control systems, or in any other system or process where frequency modulated signals occur, or frequency or speed needs to be controlled.

It will therefore be understood that while we have shown and described our invention in several preferred forms, changes may be made without departing from the scope of the invention, as sought to be defined in the following claims. In the claims reference to the positive or negative side of the wave is used merely for convenience, and is not intended to exclude a reverse connection, the only requirement being that the two sides be of opposite polarity. The reference to a balance or zero crossing at the center frequency is not intended to mean that there might not be other zero crossings at other frequencies.

When more complex networks with multiple reactances or delay elements are used in the differentiating network it will be possible to obtain frequency detecting action at a number of different center frequencies, generally one center frequency per reactive element or quarter wave length of delay line. If these additional zero crossings of the output average value are not desired then their effects may be minimized by proper circuit design.

When driving single ended diode switching versions of our circuits from practical voltage or current sources (as contrasted to the ideal sources generally assumed throughout the previous specification in which a voltage source is purely a voltage source, and a current source is purely a current source) it may be desirable to balance the load seen by the source on the two half cycles of the input wave. This may be done by the appropriate connection of a diode and resistor combination either in series with the input of our circuits or in parallel with the input of our circuits. This is not needed with transistor switching.

We claim:

1. Apparatus for demodulating a frequency modulated carrier, said apparatus comprising means to differentiate a portion of the input, means to feed the positive side of the derivative to the output, means to provide a bucking wave corresponding to another portion of the input, means to feed the negative side of the bucking wave to the output, the aforesaid means having components selected and adjusted for a ratio of the two opposite feeds such that at a desired center frequency the average output is zero, the means to feed the positive side of the derivative to the output being a first transistor with a bias source biasing it to a voltage higher than the load voltage, and the emitter side of said first transistor being shunted by a first diode, the means to feed the negative side of the attenuated wave to the output being a second transistor with a bias source biasing it to a voltage higher than the load voltage, the emitter side of the second transistor being shunted by a second diode, one of said transistors being PNP and the other being NPN, and said diodes being polarized oppositely to one another and each oppositely to the emitter circuit that it shunts.

2. Apparatus for demodulating a frequency modulated carrier, said apparatus comprising means to differentiate a portion of the input, means to feed the positive side of the derivative to the output, means to attenuate another portion of the input, means to feed the negative side of the attenuated wave to the output, the aforesaid means having components selected and adjusted for a ratio of the two opposite feeds such that at a desired center frequency the average output is zero independently of the amplitude of the input, and the average value of the output varying with frequency because the average value of the aforesaid derivative portion varies with frequency while that of the aforesaid attenuated portion remains substantially constant, the means to feed the positive side of the derivative to the output being a first transistor with a bias source biasing the base to a voltage higher than the load voltage, the emitter side of said first transistor being shunted by a first diode, the means to feed the negative side of the attenuated wave to the output being a second transistor with a bias source biasing the base to a voltage higher than the load voltage, the emitter side of the second transistor being shunted by a second diode, one of said transistors being PNP and the other being NPN, and said diodes being polarized oppositely to one another and each oppositely to the emitter circuit that it shunts.

3. Apparatus for demodulating a frequency modulated carrier, said apparatus comprising means to differentiate a portion of the input, means to feed the positive side of the derivative to the output, means to provide a bucking wave corresponding to another portion of the input, means to feed the negative side of the bucking wave to the output, the aforesaid means having components selected and adjusted for a ratio of the two opposite feeds such that at a desired center frequency the average output is zero, the means to differentiate a portion of the input being made up of a combination of a resistor and a suitably terminated delay circuit.

4. Apparatus for demodulating a frequency modulated carrier, said apparatus comprising means to differentiate a portion of the input, means to feed the positive side of the derivative to the output, means to attenuate another portion of the input, means to feed the negative side of the attenuated wave to the output, the aforesaid means having components selected and adjusted for a ratio of the two opposite feeds such that at a desired center frequency the average output is zero independently of the amplitude of the input, and the average value of the output varying with frequency because the average value of the aforesaid derivative portion varies with frequency while that of the aforesaid attenuated portion remains constant, the means to differentiate a portion of the input being made up of a combination of a resistor and a suitably terminated delay circuit.

5. Apparatus as defined in claim 1 in which the means to differentiate a portion of the input is a capacitor.

6. Apparatus as defined in claim 1 in which the means to differentiate a portion of the input is an inductor.

7. Apparatus as defined in claim 1 in which the means to differentiate a portion of the input is a combination of a capacitor and an inductor.

8. Apparatus as defined in claim 1 in which the means to differentiate a portion of the input is a combination of a capacitor and an inductor connected in parallel and resonant at a frequency offset from the desired center frequency.

9. Apparatus as defined in claim 3 in which the input is fed to two parallel circuits, one of said circuits having the differentiator, the other circuit having a diode, the parallel circuits being connected to a common load and thence to a common return conductor leading from the load back to the input, and a diode connected from the common return connector to that one of the parallel circuits having the differentiator, the connection to the said parallel circuit having the differentiator being made between its differentiator and the load, the diodes being so polarized that the load receives derivative half cycles of one polarity and bucking half cycles of opposite polarity.

10. Apparatus as defined in claim 3, in which there are two such circuits arranged back-to-back, said circuits having a common input to which they are connected in parallel, the outputs being connected so as to be additive.

11. Apparatus as defined in claim 3, in which there are two such circuits arranged back-to-back, said circuits having a common input to which they are connected in phase opposition so that the circuits are operated in alternation or push pull, the outputs being so connected as to be additive.

12. Apparatus as defined in claim 1 in which the means to differentiate a portion of the input is made up of a combination of a resistor and a suitably terminated delay circuit.

13. Apparatus as defined in claim 2 in which the means to differentiate a portion of the input is made up of a combination of a resistor and a suitably terminated delay circuit.

14. Apparatus as defined in claim 1 in which the means to differentiate a portion of the input is a piezoelectric device having a resonance frequency which is offset from the desired center frequency.

References Cited by the Examiner

UNITED STATES PATENTS

| | | | |
|---|---|---|---|
| 2,878,384 | 3/1959 | Holmes | 329—103 |
| 2,938,170 | 5/1960 | Berry | 328—127 X |
| 3,108,230 | 10/1963 | Hurtig | 325—349 X |
| 3,128,437 | 4/1964 | Loughlin | 329—133 |

NATHAN KAUFMAN, *Primary Examiner.*

A. L. BRODY, *Assistant Examiner.*